United States Patent [19]
Franklin

[11] Patent Number: 5,169,190
[45] Date of Patent: Dec. 8, 1992

[54] BOXCAR BULKHEAD DRAWBAR AND METHOD

[76] Inventor: Richard W. Franklin, 580 Browning Ave., Manistee, Mich. 49660

[21] Appl. No.: 779,889

[22] Filed: Oct. 21, 1991

[51] Int. Cl.⁵ ............... B65G 7/00; B61D 45/00
[52] U.S. Cl. .................... 294/15; 294/26; 410/134; 292/336.3; 292/40
[58] Field of Search ............. 294/15, 17, 18, 19.1, 294/26; 254/131, 133 R; 410/134, 137, 138; 292/336.3, 347, 40

[56] References Cited

U.S. PATENT DOCUMENTS

| | | | |
|---|---|---|---|
| 2,376,290 | 5/1945 | Stewart | 294/26 |
| 2,476,594 | 7/1949 | Gingrich | 294/19.1 X |
| 2,539,031 | 1/1951 | Pidgeon | 294/19.1 |
| 3,209,707 | 10/1965 | Erickson et al. | 410/134 X |
| 3,648,623 | 3/1972 | Erickson | 410/134 |
| 4,345,862 | 8/1982 | Blout et al. | 410/134 |
| 4,659,124 | 4/1987 | Hillman | 294/19.1 |
| 4,802,391 | 2/1989 | Willhoite et al. | 294/19.1 X |

Primary Examiner—Charles A. Marmor
Assistant Examiner—Dean J. Kramer
Attorney, Agent, or Firm—Barnes, Kisselle, Raisch, Choate, Whittemore & Hulbert

[57] ABSTRACT

A method and drawbar apparatus for engaging a latch of and manually moving a bulkhead door in a railroad boxcar. The drawbar has an elongate bar with a T-shaped handle at one end and a generally arcuate hook at the other end. In use, the bar retains the latch handle in a released position and applies a manual force to the bulkhead to move it. The T-shaped handle is distal from the bulkhead to safely keep a worker's digits, torso and feet from the door and boxcar sidewall. To facilitate easy and smooth movement of the bulkhead door, the hook removably engages and interlocks with the latch or a latch shaft so that force is applied to the bulkhead door adjacent its center of mass.

14 Claims, 2 Drawing Sheets

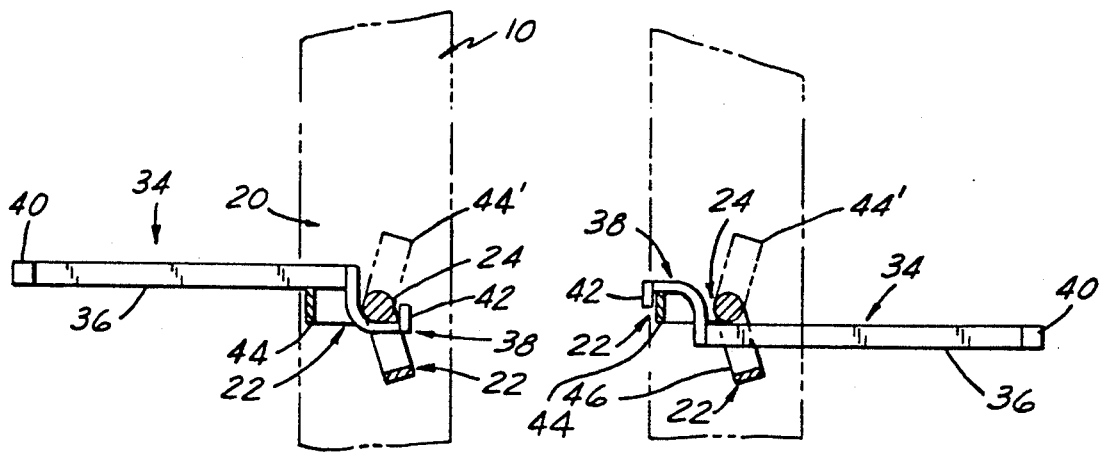
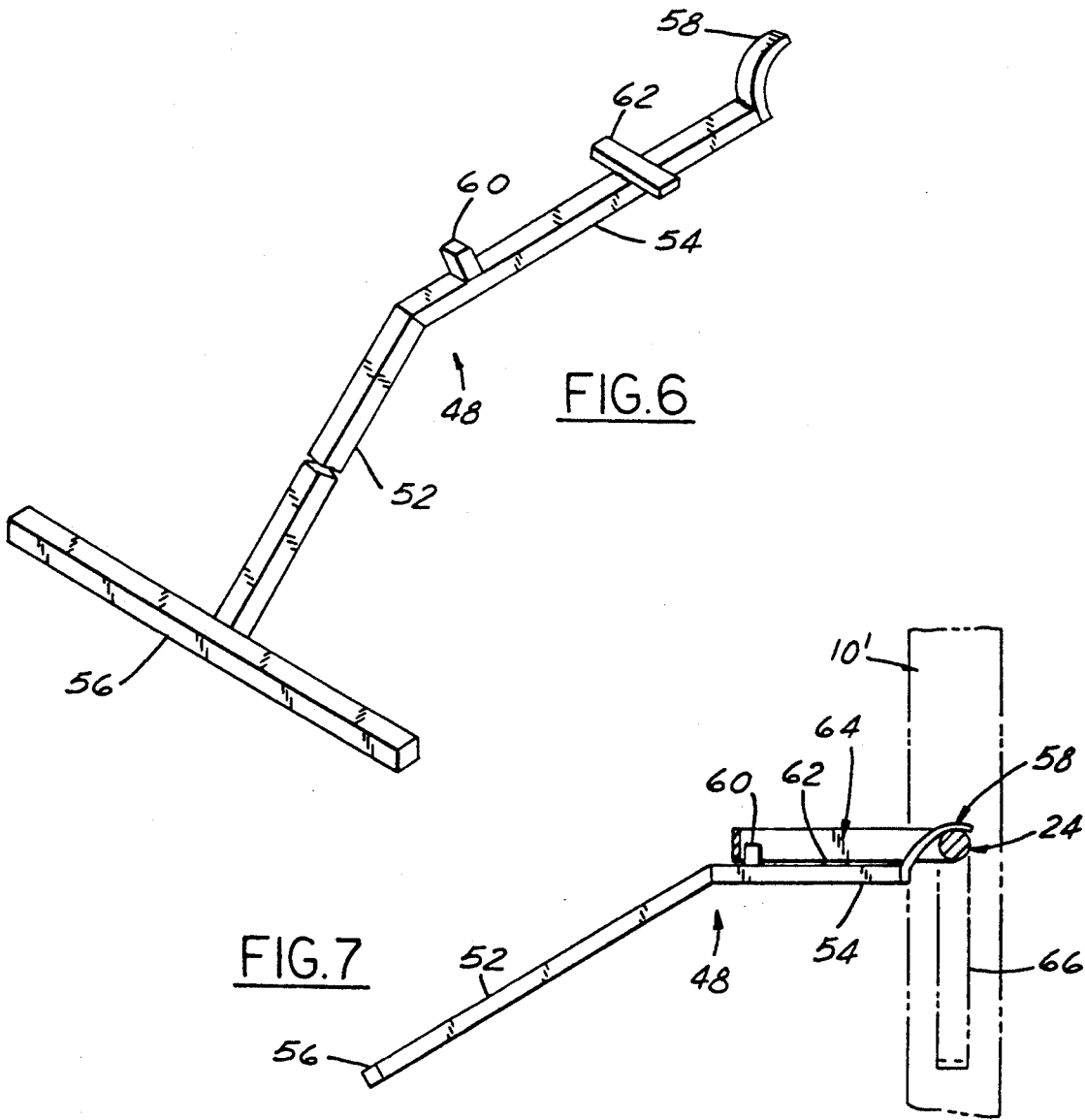

BOXCAR BULKHEAD DRAWBAR AND METHOD

FIELD OF THE INVENTION

This invention relates to bulkhead load dividers for railway boxcar and particularly to a method and apparatus for manually moving boxcar bulkheads.

BACKGROUND

Commonly, relatively massive railroad boxcar bulkheads or load dividers are employed to restrain cargo from shifting around within the boxcar during transit. Each bulkhead consists of one or more large panels the approximate size of a boxcar's transverse cross-section. Each bulkhead is positioned transversely within a railroad boxcar and pivotally carried by overhead tracks for movement longitudinally within the boxcar. The bulkhead has a mechanism for releasably locking it in position to prevent the cargo from shifting during transport.

To unload, load and secure cargo, the bulkheads must be moved. Previously, workers would unlock and manually pull or push the heavy bulkhead into position. Frequently, one worker would unlock the bulkhead while another would assist in moving it by pushing or pulling one edge of the bulkhead with their fingers precariously positioned in the narrow space between the bulkhead and the inner wall of the boxcar. Not infrequently, strained backs and pinched fingers have resulted from sudden forward and/or lateral skewing movement of the freely pivoting bulkhead. Feet can also be nipped if the bulkhead unexpectedly swings toward the worker.

An unlocked bulkhead can also be moved by manual rotation of a loop of an overhead pull chain. However, if the door lurches in either direction, the chain can grab and injure the fingers of the operator. Feet can also be nipped if the bulkhead unexpectedly swings toward the worker. Moreover, this pull chain is cumbersome and often not used.

SUMMARY OF THE INVENTION

A method and drawbar apparatus for retaining a bulkhead latch in its unlocked position and manually moving the bulkhead with the operators distal from the bulkhead. The drawbar has a hook for engaging the bulkhead and retaining the latch handle in a released or unlocked position and a handle connected to the hook by an elongate bar of sufficient length to dispose the handle distal from the bulkhead, so that the operators digits are remote from the bulkhead to prevent injury.

In use, a worker rotates a bulkhead latch handle to its released position and the drawbar hook is engaged with the latch. The latch handle is retained in its released position by the drawbar while preferably two workers grasp the drawbar handle to manually move the bulkhead longitudinally within the cargo area of a boxcar.

Objects, features and advantages of this invention are to provide a method and apparatus for moving a bulkhead which greatly reduces the risk of worker injury, disposes the workers fingers, feet and torso away from the bulkhead, reduces the risk of strain and back trauma, automatically retains a bulkhead latch handle in a released position, minimizes skewing, pivoting and jamming of the bulkhead, enables quick, easy and efficient movement of the bulkhead, and a drawbar which quickly and easily engages and disengages with the bulkhead and latch and, is strong, rugged, durable, relatively lightweight, and of simple design and economical to manufacture.

BRIEF DESCRIPTION OF THE DRAWINGS

These and other objects, features and advantages of this invention will be apparent from the following detailed description, appended claims and accompanying drawings in which:

FIG. 4 is a fragmentary sectional side view of the bulkhead depicting engagement of the drawbar of FIG. 3 with the latch from one side of the bulkhead.

FIG. 5 is a sectional side view of the bulkhead depicting engagement of the drawbar of FIG. 3 with the latch from the other side of the bulkhead.

FIG. 6 is a perspective view of a second embodiment of a drawbar of this invention.

FIG. 7 is a fragmentary sectional side view of another bulkhead depicting engagement of the drawbar of FIG. 6 with a modified latch of the bulkhead.

DETAILED DESCRIPTION

Figure 1:
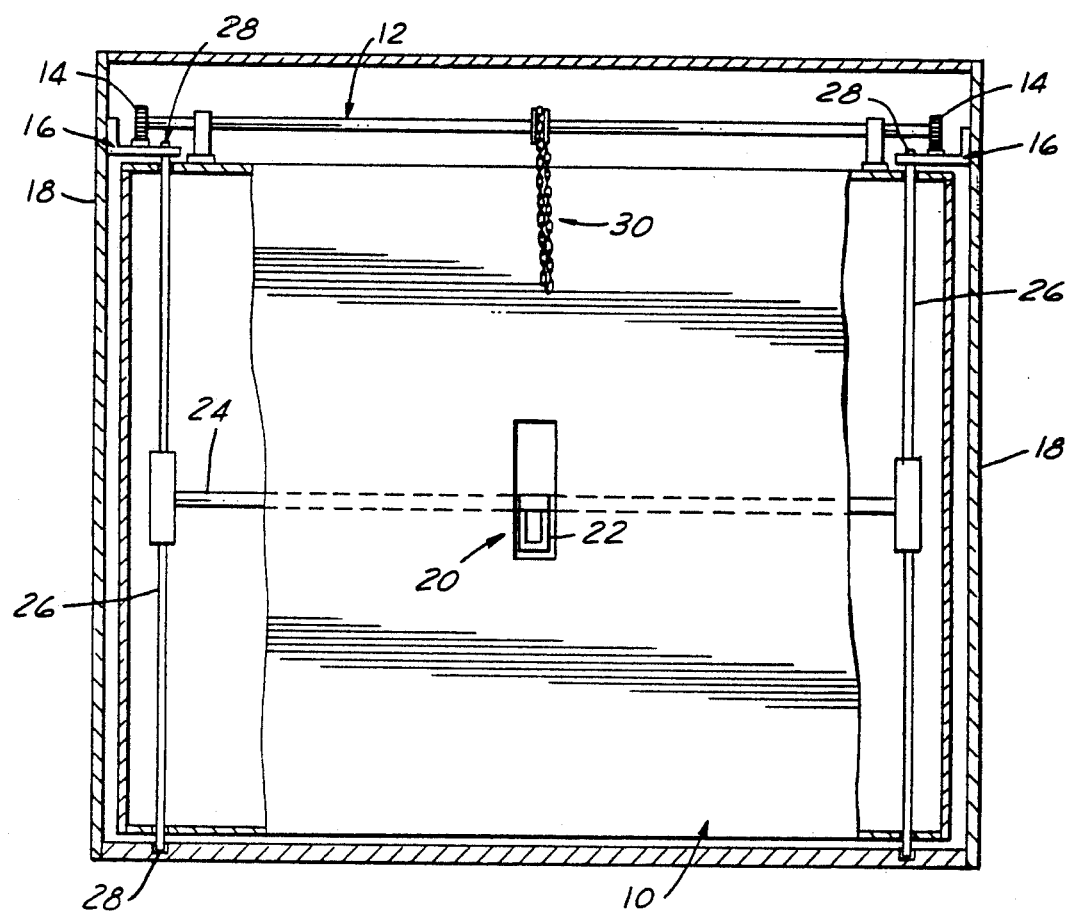
FIG. 1 is a transverse sectional view of a railroad boxcar with a typical boxcar bulkhead therein.

Referring in more detail to the drawings, FIG. 1 illustrates a railroad boxcar with a typical bulkhead arrangement with a door 10 pivotally carried by a support shaft 12 with sprockets 14 on both ends which engage corresponding cogs or openings in overhead suspension tracks and guideways 16. To permit the door to be moved longitudinally within the boxcar, the tracks 16 extend the length of the boxcar and are fixed to its sidewalls 18 adjacent the top.

To permit the door 10 to be released, moved and locked in place to secure cargo in the boxcar, it has a lock mechanism 20. The lock mechanism has a latch handle 22 disposed in a hole through the door to provide access to the handle from both sides of the door. The handle is fixed to a shaft 24 journaled for rotation in the door and operably linked to four vertical locking pins 26. To lock the door, the pins are spring biased into sockets 28 in both the overhead tracks 16 and the floor of the boxcar. A plurality of longitudinally spaced apart sockets extend the length of the tracks 16 and the boxcar floor. The door is unlocked and released by rotating handle 22 to the position shown in FIG. 2 which retracts and withdraws the pins 26 from the sockets. Because the pins are spring biased, the door will automatically lock when the handle is released and the pins snap into the sockets when aligned therewith.

With the lock mechanism released, the door can be moved by manually pulling on a loop of chain 30 received on a sprocket fixed to the shaft 12 to thereby rotate the sprockets 14 to move the door. However, in practice, this chain was inconvenient, combersome, and seldom used and the door was previously moved by workers manually pushing and pulling it. When the door is released, it is free to swing or pivot about the shaft 12 and when being moved has a tendency for both the bottom to swing and the door to become cocked, skewed or rotate about a central vertical axis and thereby become jammed in the tracks and guideways 16.

Figure 2:
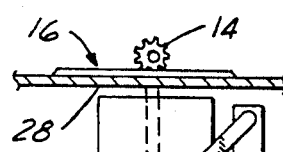
FIG. 2 is a fragmentary longitudinal sectional view of the boxcar illustrating use by two persons of a drawbar of this invention to move the bulkhead.

As shown in FIG. 2, in accordance with the method of this invention, the door is released and moved by manually rotating the latch handle 22 to the released position, engaging a draw bar 34 with the latch mechanism to both retain the latch in its released position and apply force to the central region of the door, and with at least one, and preferably two, workers 32 manually grasping the free end of the drawbar and pushing or preferably pulling on the drawbar to move the door. When the door is moved to its desired position, the drawbar is removed and the handle released to lock the door in the desired position.

Figure 3:
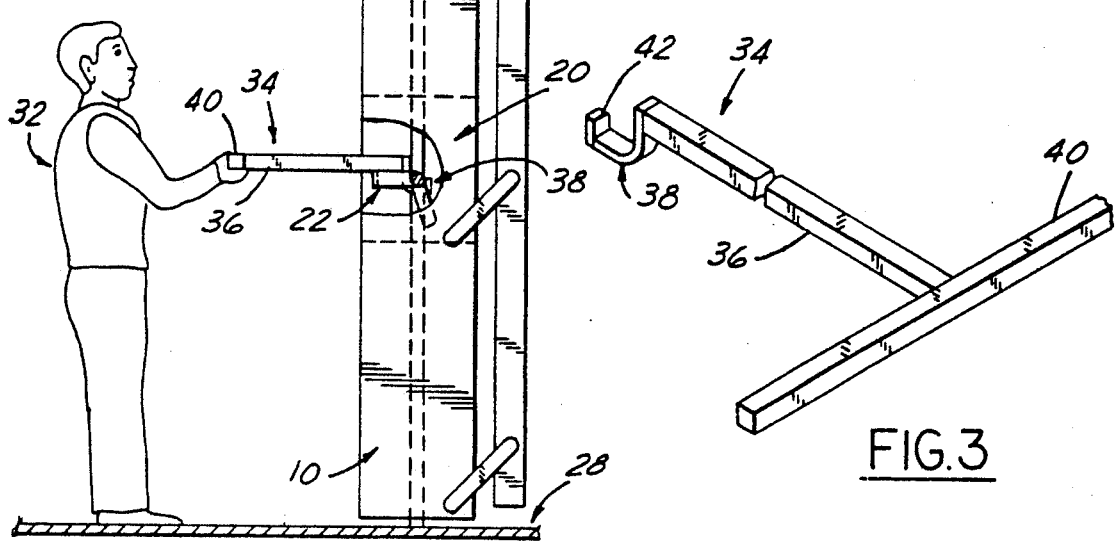
FIG. 3 is a perspective view of a first embodiment of a drawbar of this invention.

FIGS. 2-5 illustrate a first embodiment of the drawbar 34. As shown in FIG. 3, the drawbar has an elongate bar 36 with a hook 38 at one end and a T-shape handle 40 at the other end. The hook has a return bend or a generally U-shape configuration with a lug 42 on its free end.

FIGS. 4 and 5 illustrate use of the drawbar 36 on opposite sides of the door 10. As shown in FIGS. 2 and 4, with the handle 22 in the released position shown in solid lines, the drawbar hook 38 is inserted between the handle loop 44 and the shaft 24 so that the hook underlies and encircles the shaft. As shown in FIG. 2, with the hook so engaged, the workers grasp the handle 40 and pull on it to move the door toward them. When the door is in the desired position, the drawbar 34 is removed and the handle 22 released. Due to the spring bias, the door will automatically lock when the lock pins become aligned with and project into the sockets 28. When the door is locked, the loop 44 of the handle is in the position shown in phantom at 44'.

As shown in FIG. 5, for moving the door from its other side, the drawbar 34 is flipped over and the hook 38 is inserted through the loop 46 of the handle and over the loop 44 so that it encircles and engages the loop 44. With the drawbar so engaging the handle 22, preferably two workers grasp the handle 40 and pull on the drawbar to move the door toward them. When the door is in the desired position, the drawbar is removed and the handle 22 released to automatically lock the door when the pins are aligned with and project into the sockets 28. Of course, if there is no load behind the door, such as when the boxcar is empty, the bulkhead can also be moved by inserting the drawbar and manually pushing on the handle of the drawbar to move the door.

FIGS. 6 and 7 illustrate another embodiment of a drawbar 48 used with a door 10' having a modified latch handle 64. The handle 64 is a generally U-shaped strap with the ends of its legs fixed to the shaft 24. When the lock mechanism 20 is released, the handle 64 extends generally horizontally and when locked, the handle is received completely within the hole in the door and extends vertically downward as shown in phantom at 66. The handle 64 can be moved to extend through either side of the door and generally horizontally to release the lock mechanism 20.

To facilitate ease of use and reduce the risk of back strain, the drawbar 48 has two elongate bars 52 and 54 inclined at an obtuse included angle of about 120° and fixed together at adjacent ends. A T-shaped handle 56 is attached to one end of the bar 52 for manual engagement by preferably two workers to move the bulkhead door. For engaging the latch, a generally curved hook 58 is fixed to the other end of the bar 54 and preferably encompasses an arc of about 90°. For engaging the bight of the latch handle 64, an upstanding lug 60 is fixed on the bar 54 generally perpendicular thereto and spaced an appropriate distance from hook 58. To facilitate alignment of the drawbar with the lock handle, a spacer block 62 extends transversely across and is fixed to the bar 54.

In use, to move the door 10, the handle 64 is moved to the released position, as shown in FIG. 7, and the hook 58 of the drawbar 48 is inserted under the handle and over the shaft 24 with the lug 60 being disposed behind the bight of the handle and the spacer bar 62 received between the legs of the handle. With the drawbar so engaged with the latch mechanism, one, and preferably two workers, manually grasp the handle 56 and pull on it to move the door toward them. When the door is in the desired position, the drawbar is disengaged from the handle 64 which automatically returns to the locked position (shown in phantom at 66) when the pins become aligned with and project into the sockets to lock the door in the desired position. Since the door can be released by pivotally moving the handle 64 so that it projects horizontally from either side of the door, the drawbar 48 is used in the same manner to move the door 10' from either side of the door.

Preferably, the drawbars are constructed of hollow tubular steel having a generally rectangular cross-section although tubular steel having a generally cylindrical cross-section section may be used. Preferably, all components of the drawbars are steel and are welded together. However, the drawbar components could be adhesively joined or the drawbars could be of unitary construction of a plastic, rubber, polymeric composite or some other elastomeric material.

The distance between the handle and hook of the drawbars and hence the length of the bars 36 or bars 52 & 54 is sufficient to position the hands, feet and torso of the workers far enough from the bulkhead door and its edges to avoid injury by the door swinging or moving and pinching, nipping or striking the workers. Usually, a length of at least about two feet is sufficient. This positions the workers so they will not be struck or engaged by the moving door and since their fingers must grasp the handle they are kept out of harms way. Also, when moving the door, the workers must face it and thus can visualize or see what is occurring and, if needed, move away to avoid any injury Furthermore, since the manual force is applied to the door adjacent its center, the tendency for it to swing and skew or cock is greatly reduced.

While the present invention has been disclosed in connection with the preferred embodiments thereof, it should be understood that there may be other embodiments which fall within the spirit and scope of the invention and that the invention is susceptible to modification, variation and change particularly to adapt it to different configurations of the locking mechanism and handle without departing from the scope or fair meaning of the following claims.

I claim:

1. A drawbar for engaging a latch mechanism having a rotatable shaft and release handle of a bulkhead in a boxcar and manually moving the bulkhead comprising, an elongated bar, a drawbar handle attached adjacent one end of said elongate bar for manual engagement to apply force to the bulkhead, a hook attached adjacent the opposite end of said elongate bar for releasably and removably engaging one of the release handle and shaft of the latch mechanism, an abutment carried by said elongate bar and bearing on the other of such release handle and shaft for retaining said release handle in a released position when the portion of said elongate bar adjacent the release handle extends generally horizontally, said elongate bar being of sufficient length to dispose said drawbar handle distal from the bulkhead when said hook and abutment are both engaged each with one of the shaft and release handle, whereby force can be manually applied to said drawbar handle to move the bulkhead relative to the boxcar without manually directly grasping the bulkhead.

2. The drawbar of claim 1 wherein said hook has a generally radially inturned end enabling engagement with one of the release handle and shaft of the bulkhead latch mechanism to apply force for moving the bulkhead relative to the boxcar.

3. The drawbar of claim 1 wherein said hook has a generally radially inturned lug fixed on the free end thereof.

4. The drawbar of claim 1 wherein said handle has a generally T-shape for manual engagement of said handle to apply force to the bulkhead to move it relative to the boxcar.

5. The drawbar of claim 1 wherein said handle has a T-shape and sufficient length for manual engagement by two persons.

6. The drawbar of claim 1 wherein said handle has a T-shape and the bar has first and second elongate portions forming an included obtuse angle.

7. The drawbar of claim 6 wherein said first elongate portion forms an obtuse included angle of about 120° with said second elongate portion.

8. The drawbar of claim 1 wherein said bar and handle are constructed of tubular steel.

9. The drawbar of claim 1 wherein said bar and handle are constructed of tubular steel having a generally rectangular cross-section.

10. The drawbar of claim 1 wherein said drawbar is comprised of one piece of homogeneous material.

11. The drawbar of claim 10 wherein the homogeneous material is plastic, rubber, polymeric composite and other elastomeric material.

12. A drawbar for engaging a latch mechanism having a rotatable shaft and release handle of a bulkhead in a boxcar and manually moving the bulkhead comprising, an elongate bar having a first elongate portion and a second elongate portion, said first portion forming an obtuse included angle with said second portion, a drawbar handle attached to said first portion adjacent one end of said elongate bar for manual engagement to apply force to the bulkhead, a hook attached to said second portion adjacent the opposite end of said elongate bar for releasably and removably engaging the shaft of the latch mechanism, an abutment carried by said elongate bar and bearing on the release handle for retaining the latch mechanism in a released position when the second portion of the bar extends generally horizontally, an upstanding lug mounted on and generally perpendicular to said second elongate portion and spaced from said hook, said lug being releasably and removably engagable with the release handle to apply force to move the bulkhead relative to the boxcar, and a spacer block mounted on said second portion between said lug and said hook, said block being generally centered on and transverse to the longitudinal axis of said elongate bar for aligning the drawbar with the release handle, and said bar being of sufficient length to dispose said drawbar handle distal from the bulkhead, whereby force can be manually applied to said handle of the drawbar to move the bulkhead relative to the boxcar.

13. A method of moving a bulkhead in a railroad car which has a lock mechanism operably connected with a rotatable shaft and release handle movable to disengage with the lock mechanism, the method comprising:
  a. providing a drawbar having an elongate bar with a hook adjacent one end removably and releasably engagable with one of the release handle and shaft of the lock mechanism, an abutment carried by the drawbar and when an adjacent portion of the drawbar extends generally horizontally bearing on the other of the handle and shaft to retain the handle in the released position, and a drawbar handle adjacent the other end;
  b. moving the release handle of the bulkhead to its released position;
  c. releasably coupling the hook of the drawbar with one of the release handle and shaft of the bulkhead and engaging the abutment with the other of such release handle and shaft with such adjacent portion of the drawbar extending generally horizontally to retain the handle in its released position;
  d. manually grasping the drawbar handle of the drawbar and applying force to move the bulkhead generally longitudinally in the boxcar; and
  e. disengaging and removing the releasable hook and the drawbar from the bulkhead.

14. The method of claim 13 wherein the force is manually applied to the handle of the drawbar to move the bulkhead by two persons manually grasping with their hands the handle of the drawbar while standing in the boxcar facing the bulkhead with their feet spaced from the bulkhead.

* * * * *